Jan. 18, 1938.  C. H. KLEIN  2,106,007
WIRE CONNECTING DEVICE
Filed Sept. 9, 1936  2 Sheets-Sheet 1

INVENTOR.
Charles H. Klein
BY Fay, Oberlin & Fay
ATTORNEYS.

Jan. 18, 1938.                 C. H. KLEIN                 2,106,007
                          WIRE CONNECTING DEVICE
                          Filed Sept. 9, 1936           2 Sheets-Sheet 2

INVENTOR.
Charles H. Klein
BY Fay, Oberlin & Fay
ATTORNEYS

Patented Jan. 18, 1938

2,106,007

UNITED STATES PATENT OFFICE

2,106,007

WIRE CONNECTING DEVICE

Charles H. Klein, Cleveland, Ohio, assignor to The National Telephone Supply Company, Cleveland, Ohio, a corporation of Ohio Application September 9, 1936, Serial No. 99,977

7 Claims. (Cl. 173—263)

This invention relates, as indicated, to wire connecting devices, but is directed more particularly to devices adapted for use in making joints in electrical conductors or wires used for telephone, telegraph or other purposes.

In joining wires, the ends of which are in axial alignment with each other, it has been customary to provide a tubular sleeve, such, for example, as disclosed in Brenizer Patent No. 1,936,185, and after inserting the ends of the wires into opposite ends of the sleeve, to compress the sleeve about the wire ends.

Such a sleeve, however, is of no practical value in forming joints in which the wires to be joined are angularly related to each other, or in "dead ending" a wire, that is, forming a loop at the end of a wire and joining the end of the wire to the body thereof at the point where the loop begins.

It is a primary object of the present invention to provide wire connecting devices through the use of which "dead-ending" is greatly facilitated, as well as the tapping of line wires from the end thereof and at points spaced from the end, the bridging of drop and line wires from feeders, and the bridging of bridle wires from open wire dead-ends.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but a few of the various mechanical forms in which the principle of the invention may be used.

In said annexed drawings:—

Referring to that form of device shown in Figs. 1 to 9 inclusive, there is disclosed a tubular sleeve which is curved or bent intermediate its ends to provide angularly related portions 1 and 2. The wall of this sleeve adjacent the curve or bend has an opening therethrough, which is in effect a continuation of the passage through the portion 1 of the sleeve. The sleeve is preferably formed of copper or steel and may, if desired, be treated in the manner disclosed in the aforesaid patent to enhance its effectiveness in making a joint.

Figure 4:
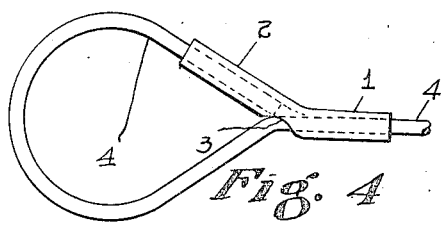
Fig. 4 is a view showing the device as used in making a "dead-end" joint.
Figure 3:
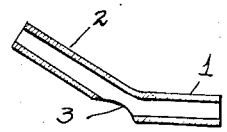
Fig. 3 is a longitudinal cross-sectional view of the device shown in Fig. 1.

In forming a "dead-end" joint, the portion 1 of the sleeve is threaded onto the wire 4, as shown in Fig. 4 and the wire looped so as to cause the end thereof to enter the portion 2 of the sleeve, the wire being pushed into this portion of the sleeve substantially as far as the bend of the sleeve, so that the various parts of the wire and sleeve are disposed in the manner clearly shown in Fig. 4.

Figure 6:
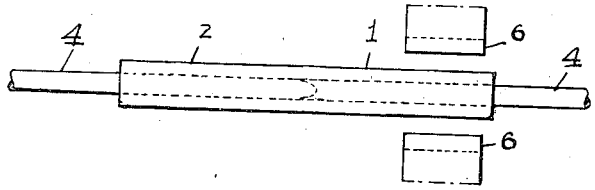
Fig. 6 is a view on an enlarged scale of the parts shown in Fig. 4 showing the sleeve placed between two open dies as a convenient means to be employed in compressing the same.
Figure 7:
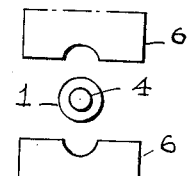
Fig. 7 is an end view of the parts shown in Fig. 6.
Figure 8:
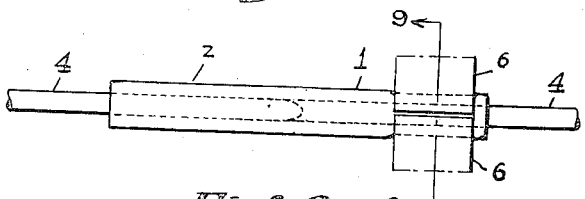
Fig. 8 is a view similar to Fig. 6, showing the dies in the closed position and a part of the sleeve compressed thereby.
Figure 9:
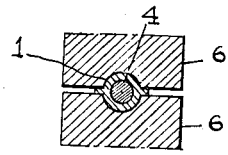
Fig. 9 is a transverse section on the line 9—9 of Fig. 8.
Figure 5:
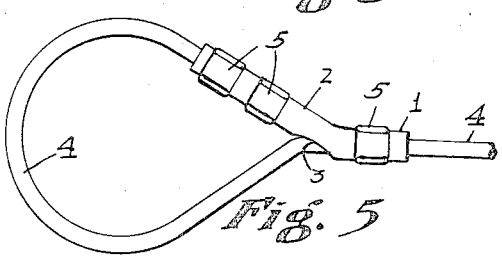
Fig. 5 is a view of the completed joint.

With the sleeve thus positioned, it is forcibly compressed circumferentially upon the portions of the wire therein in order to effectively anchor the wire to the sleeve, and enable the latter to resist any tendency of the wire to become withdrawn from the sleeve, as by pulling the wire. In Fig. 5 of the drawings, a finished joint is shown in which three compressed areas 5 are shown. The compression of the sleeve is effected by means of a tool (not shown) having dies 6, as shown in Figs. 6, 7, 8, and 9. In producing the compressed areas 5 with the aid of these dies, the sleeve is placed between the open dies, as shown in Figs. 6 and 7. The dies are forced toward each other to the closed position, shown in Figs. 8 and 9. The dies are so shaped that when they are forced to the closed position they will circumferentially compress the part of the sleeve placed between them. After one of the compressed areas 5 has been thus produced, the dies are opened, and the tool moved so as to position the dies for the production of another compressed area 5, the dies are again closed, and so on until all of the compressed areas have been produced.

The joint thus formed is excellent from both the mechanical and electrical standpoint and can be produced at a cost considerably less than that of other "dead-end" joints, as now used.

Figure 10:
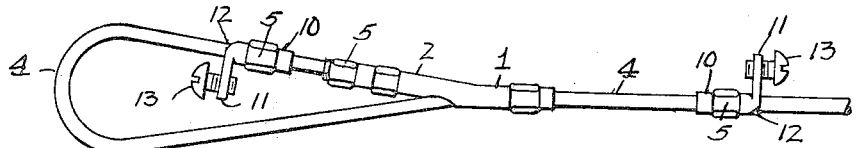
Fig. 10 is a view showing another form of wire connecting device, as used for a tapping line wire from a "dead-end" or from a point spaced from the end.

Referring to the device shown in Fig. 10, this device comprises a tubular sleeve portion 10 and a tap portion 11 which extends at an angle to the sleeve portion. The wall of the sleeve is pierced at the junction of the sleeve and tap portions to provide an opening 12 which is in effect a continuation of the passage through the tubular sleeve portion 10 of the device. The tap portion 11 of the device is made by compressing the tubular sleeve from which the device is made until the walls are flattened so as to form in effect a flat terminal. The tap portion of the device is then perforated for threaded engagement by a terminal screw or bolt 13.

Figure 1:
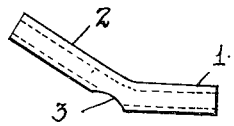
Fig. 1 is a side view of a wire connecting device which is particularly adapted for making "dead-end" joints.
Figure 2:
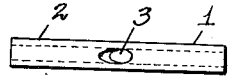
Fig. 2 is a bottom plan view of the device shown in Fig. 1.

In using the device, the sleeve portion 10 thereof is threaded into the wire and moved to any desired point as shown in Fig. 10, rotated so as to bring the portion 11 thereof to the desired position, and then compressed on the wire in the same manner that the device shown in Fig. 1 is compressed. The tap portion 11 of the device may then be utilized for tapping a bridle or drop wire from the wire 4.

Figure 11:
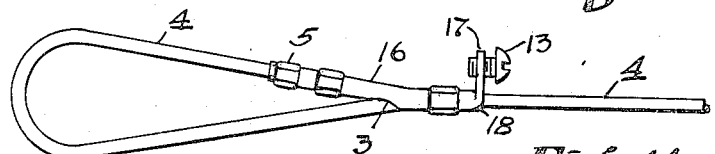
Fig. 11 is a view showing another form of wire connecting device, as used for bridging bridle wire from an open wire "dead-end"

In Fig. 11 is shown a device which is designed to combine the functions of the devices shown in Figs. 1 and 10. It consists of a sleeve 16, which is similar in all respects to the device shown in Fig. 1, but in addition is provided at one end with a laterally directed tap portion 17, which is similar in construction to the tap portion 11 of the device shown in Fig. 10, being formed in the same manner as the latter. In addition to the wall opening which corresponds to the wall opening 3 in the device of Fig. 1, a second opening 18 is provided in the wall of the junction of the sleeve with the tap portion 17. This permits the device to be threaded onto a wire 4, and after being positioned as shown in Fig. 11, the sleeve is compressed at spaced points as shown. This device is particularly adapted for bridging bridle wire from an open wire dead-end.

Figure 12:
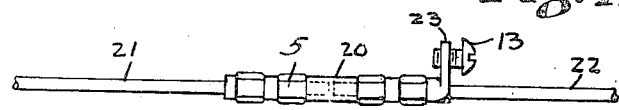
Fig. 12 is a view showing another form of wire connecting device, as used for bridging drop wires from a feeder.

In Fig. 12 is shown a device which is similar to the device shown in Fig. 11, but which has an elongated tubular sleeve portion 20 sufficiently long to receive the end portions of feeder wires 21 and 22 which are to be joined. After the end portions of these wires are inserted in the sleeve, the sleeve is compressed as shown in Fig. 12. The tap portion 23 of the device may then be utilized for the connection of a drop wire. This device is especially adapted for bridging drop wires from a feeder.

Figure 13:
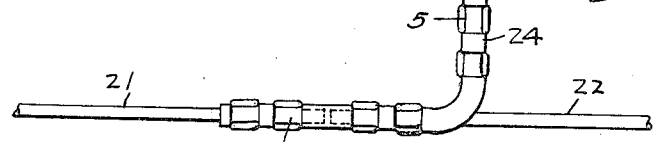
Fig. 13 is a view showing another form of wire connecting device, as used for bridging line wires from a feeder.

In Fig. 13 is shown a device similar to that shown in Fig. 12, but having instead of a flat tap portion, a tubular tap portion 24, adapted to receive a line wire. This device is used in a manner similar to the device shown in Fig. 12, but is adapted more particularly for bridging line wires from a feeder.

Figure 14:
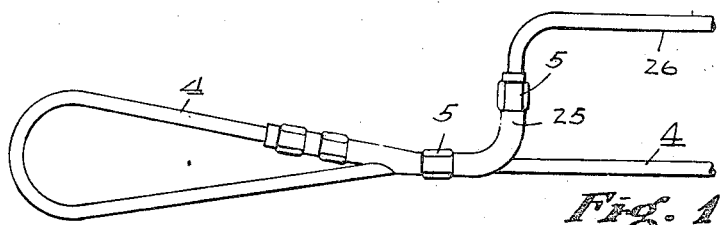
Fig. 14 is a view showing still another form of wire connecting device, as used in connecting copper to steel or toll-circuit bridling.

In Fig. 14 is shown a device which is similar to the device shown in Fig. 11, but having instead of a flat tap portion a tubular tap portion 25 adapted to receive the end of a connector wire 26. The device is used in a manner similar to the device in Fig. 11, but is adapted more especially for connecting copper to steel or toll-circuit bridling.

Figure 15:
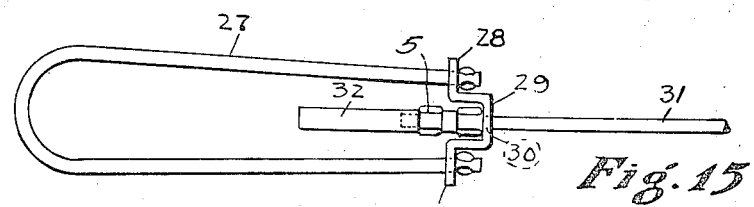
Fig. 15 is a view of a novel dead-end loop.

In Fig. 15 there is disclosed a dead-end loop consisting of a loop of wire 27, the ends of which are connected to the flanges 28 of a U-shaped member 29 having an opening 30 in the bottom thereof. The wire 31 to be "dead-ended" is inserted through this opening and there is applied to the end thereof, which lies within the loop 27, a sleeve 32, which is compressed on the wire, and which engages the member 29 so as to preclude removal of the wire loop 27 from the wire 31.

Figure 16:
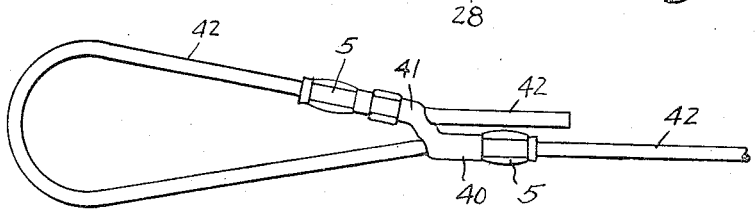
Fig. 16 is a view showing a jumper dead-end sleeve.

In Fig. 16 is shown a wire connecting device in the form of a jumper dead-end sleeve having offset non-parallel tubular portions 40 and 41, the portion 40 being secured to the body of the wire 42 and the portion 41 being secured to the end of the dead-end loop.

It will be noted that with the exception of the loop shown in Fig. 15, all of the devices are formed from a short length of copper tubing which is pierced at one or two points intermediate its ends to provide openings for the passage of wire, and then bent at the points where pierced to provide one or two portions angularly disposed with respect to the initial tube. One of such portions may be left intact for use in providing a terminal or tap, or may be flattened to provide a flat terminal.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A wire connecting device comprising a tubular member having angularly related portions, said portions comprising complete tubes and an opening in the wall of said member at the junction of said portions, said opening being in alignment with the passage through one of said portions, and being of such size as to leave more than half of the cross section of the tubular member remaining at said junction.

2. A wire connecting device formed from a single length of tubing and comprising a tubular member having three angularly related portions, there being openings in said tubing at the junctions of said portions, said openings being in alignment with the ends of said tubing and said ends and openings being adapted to receive wires.

3. A wire connecting device comprising a tubular member formed from a single length of tubing and having three angularly related portions, one of which is flattened to provide a flat terminal, the others of which are complete tubes, and openings at the junctions of said portions.

4. A wire connecting device comprising a tubular member having a central tubular portion, a portion extending from one end of said central portion at an angle thereto, a second portion extending from the other end of said central portion at an angle thereto, and openings in said tubular member at both of the junctions between said portions.

5. A wire connecting device comprising a tubular member having a central tubular portion, a tubular portion extending from one end of said central portion and at an angle thereto, and a second portion extending from the other end of said central portion and at an angle thereto, said last-named angularly extending portion being flattened to provide a flat tap or terminal, and openings in said tubular member at both of the junctions between said portions.

6. A wire connecting device comprising a member formed from a single length of tubing and having at least two angularly related portions, said portions being completely tubular, thus forming passages, and being joined by an integral connecting portion of a cross-section more than half the cross section of said tubular member, thus providing an opening at the junction of said portions, such opening being in alignment with the passage through one of said portions, whereby a wire may be inserted in one of said passages and be caused to extend through said opening.

7. A "dead end" comprising a tubular member formed from a single length of tubing and having angularly related portions, an opening in the wall of said member at the junction of said portions, said opening being in alignment with the passage through one of said portions, and a wire having a portion extending through said passage and opening, and a portion extending beyond said opening and looped in such manner that the return end thereof is disposed in the other portion of said tubular member; said opening being of such size as to leave more than half of the cross-section of the tubular member remaining at said junction, and portions of said angularly related portions of the tubular member being compressed about the wire disposed therein.

CHARLES H. KLEIN.